(12) United States Patent
Bartko

(10) Patent No.: US 9,866,294 B1
(45) Date of Patent: Jan. 9, 2018

(54) METHOD FOR TESTING A MULTIPLE-INPUT AND MULTIPLE-OUTPUT DEVICE AND TEST SYSTEM

(71) Applicant: Rohde & Schwarz GmbH & Co. KG, Munich (DE)

(72) Inventor: Hendrik Bartko, Unterhaching (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 15/269,285

(22) Filed: Sep. 19, 2016

(51) Int. Cl.
| H04L 1/20 | (2006.01) |
| H04B 7/0456 | (2017.01) |
| H04B 17/15 | (2015.01) |

(52) U.S. Cl.
CPC .......... *H04B 7/0456* (2013.01); *H04B 17/15* (2015.01)

(58) Field of Classification Search
USPC .................. 375/224, 144, 260; 370/336, 334
See application file for complete search history.

(56) References Cited

U.S. PATENT DOCUMENTS

| 7,995,537 | B2* | 8/2011 | Kent .............. H04L 25/0204 370/334 |
| 2006/0045193 | A1* | 3/2006 | Stolpman .......... H04L 27/2647 375/260 |
| 2010/0095180 | A1* | 4/2010 | Sawai .............. H04L 1/0048 714/746 |
| 2014/0029645 | A1* | 1/2014 | Yonge, III .......... H04L 12/413 375/144 |
| 2014/0119351 | A1* | 5/2014 | Yonge, III .......... H04L 12/413 370/336 |
| 2015/0092824 | A1* | 4/2015 | Wicker, Jr. ......... H04B 7/0452 375/224 |
| 2016/0212641 | A1 | 7/2016 | Kong et al. |

* cited by examiner

*Primary Examiner* — Eva Puente
(74) *Attorney, Agent, or Firm* — Schwabe, Williamson & Wyatt

(57) ABSTRACT

A method for testing a multiple-input and multiple-output device is described, said device comprising at least two receiving antennas. A first test signal is transmitted via a first transmission antenna. The first test signal is measured via each receiving antenna of said device. At least a second test signal is transmitted via a second transmission antenna. The second test signal is measured via each receiving antenna of said device. Further transmitting signals are transmitted via the transmission antennas in pairs wherein a phase difference is set between the phases of said transmitting signals transmitted via the pair of transmission antennas. Measuring the further transmitting signals via each receiving antenna of said device. A channel matrix of said device is determined. Furthermore, a test system is described.

15 Claims, 1 Drawing Sheet

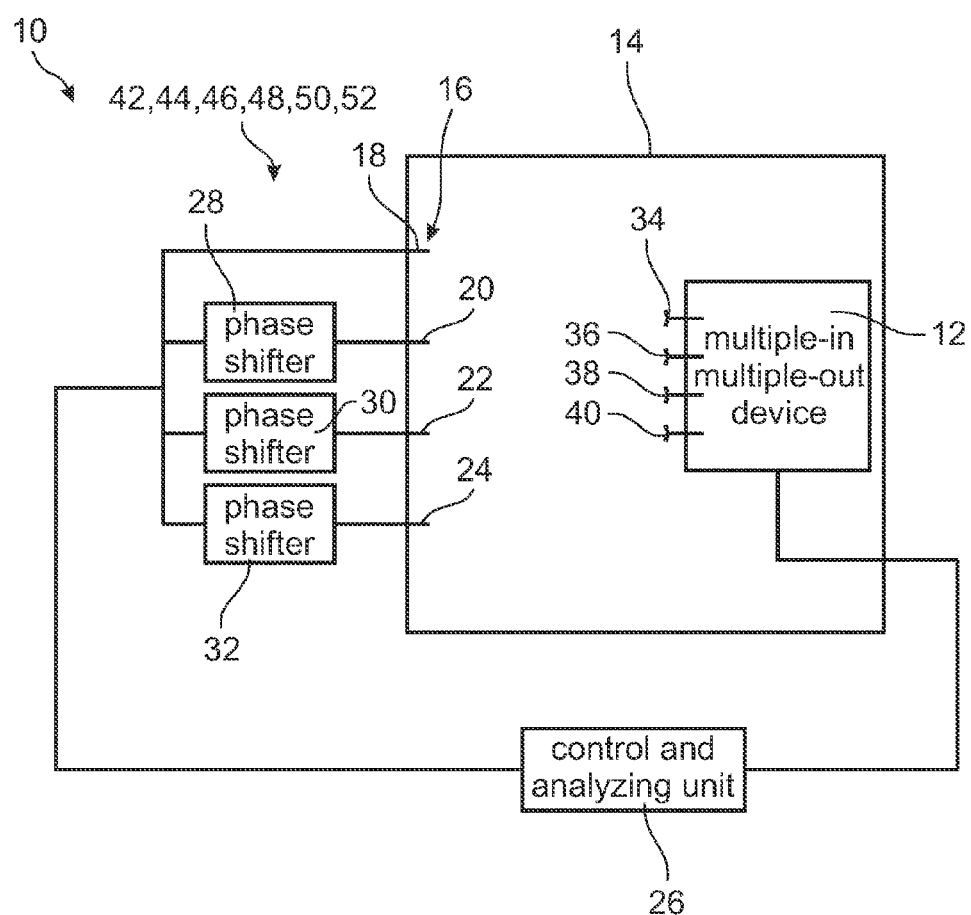

METHOD FOR TESTING A MULTIPLE-INPUT AND MULTIPLE-OUTPUT DEVICE AND TEST SYSTEM

TECHNICAL FIELD

The invention relates to a method for testing a multiple-input and multiple-output device as well as a test system.

BACKGROUND OF THE INVENTION

In radio frequency applications, different multiple-input and multiple-output devices communicate with each other wherein a transmitter is used that comprises at least one transmission antenna. The signal transmitted by the transmitter is received by a receiver that comprises at least one receiving antenna for receiving the signal transmitted by the transmitter. Such a system is a conventional radio system which is also called singe-input and single-output (SISO) system.

It is further known that the capacity of the communication can be multiplied by using more than one transmission antenna and receiving antenna. Such a system is called multiple-input and multiple-output (MIMO) system. As multiple transmission and receiving antennas are used for communication, the signals transmitted via a first transmission antenna is received by all receiving antennas such that several data channels are formed for one transmission antenna. The same applies to the other transmission antennas. Thus, devices using MIMO technique can transmit and receive several data signals simultaneously via different data channels provided between the multiple transmission antennas and the multiple receiving antennas. Accordingly, the number of data channels increase with the number of transmitting and receiving antennas. Afterwards, the data signals received via the multiple data channels have to be recomposed wherein different techniques are known in order to sort the data received via these data channels.

For testing and calibration purposes; it is necessary to know the portion of a first data signal received by a first receiving antenna wherein the first data signal has been transmitted by a first transmission antenna. This also applies for the portion of a second signal transmitted by a second transmission antenna and received by a second receiving antenna and so on.

Usually, a wire has to be used which connects a certain transmission antenna with a certain receiving antenna such that information about the dedicated data channel can be gathered.

However, multiple-input and multiple-output devices as well as the corresponding systems are designed for wireless communication. Furthermore, each of the several antennas has to be connected with each other which requires a lot of manual work for setting up the test system. Thus, it would be desirable to provide a more reliable method and test system to test a multiple-input and multiple-output device.

SUMMARY OF THE INVENTION

The invention provides a method for testing a multiple-input and multiple-output device, said device comprising at least two receiving antennas, wherein the method comprises the following steps:

a) Transmitting a first test signal via a first transmission antenna,
b) Measuring the first test signal via each receiving antenna of said device,
c) Transmitting at least a second test signal via a second transmission antenna,
d) Measuring the second test signal via each receiving antenna of said device,
e) Transmitting further transmitting signals via the transmission antennas in pairs wherein a phase difference is set between said transmitting signals transmitted via the pair of transmission antennas,
f) Measuring said further transmitting signals via each receiving antenna of said device,
g) Determining a channel matrix.

The invention is based on the finding that the channel matrix can be calculated by using the measuring results obtained by the above mentioned measuring steps. Accordingly, a cable connection between the transmitter and the receiver is no more necessary. Thus, the channel matrix can be determined wireless. Since the channel matrix is a complex one, the channel matrix comprises several complex matrix elements each referring to a certain data channel between the transmission antennas and the receiving antennas. These matrix elements are coefficients acting on the amplitude and phase of the signal transmitted by the transmission antennas. As dedicated phase information is inter alia provided during step e), relevant information is gathered for mathematically determining the channel matrix. In step e), two transmission antennas form a pair which transmits transmitting signals simultaneously. These transmitting signals transmitted simultaneously have a certain phase difference. Thus, the phases of the transmission antennas forming a pair may be actively shifted with respect to each other. Since the phase difference of the transmitting signals is set during step e), the functionality relates to an interferometer having different path lengths. In general, the channel matrix can also be called channel information. The test procedure is simpler as the several antennas do not have to be connected individually by a wire. This reduces the time for setting up the test system which in turn reduces the costs for testing.

According to an aspect, the other transmission antennas are switched off during step a), step c) and/or step e). This ensures that only the first data signal, the second data signal or rather the transmitting signals is/are transmitted during the corresponding step(s) via the dedicated transmission antennas. Thus, no disturbing signals are transmitted.

Further, a phase difference and/or power may be determined during step b), step d) and/or step f). The relevant information for determining the matrix elements can be gathered as the phase differences are used for determining the complex components of the matrix elements, for instance. As the phase difference is already preset in step e) between the transmission antennas forming a pair, the phase differences do not have to be measured in step f).

Particularly, said further transmitting signals are transmitted via all possible pairings of said transmission antennas successively. For instance, n transmission antennas correspond to $$m = \frac{n*(n-1)}{2}$$

different possible pairs of transmission antennas which can be used. Thus, phase information of the data channels can be determined for each transmission antenna with respect to the other transmission antennas. The matrix elements corresponding to the different channels can be determined accordingly, in particular their complex portions.

According to another aspect, at least two different measurements are performed for each pair wherein said transmitting signals of the transmission antennas forming an appropriate pair are phase shifted with respect to each other for each measurement such that different phase differences are obtained. During a first measurement, both transmission antennas forming a pair transmit transmitting signals simultaneously which have a certain phase difference with respect to each other. For the second measurement, the phase shift (phase difference) is changed with respect to the one during the first measurement such that both transmission antennas transmit a transmitting signal simultaneously wherein the phase difference between the transmitting signals simultaneously transmitted is different to the phase difference during the first measurement. The phase differences of the first and second transmitting signals are set wherein the phase difference is different for the first transmitting signals and the second transmitting signals. However, the phase difference during one measurement may be 0°.

Particularly, at least three different measurements may be performed for each pair wherein said transmitting signals of the two transmission antennas forming an appropriate pair are phase shifted with respect to each other for each measurement such that different phase differences are obtained. The calculation of the channel matrix improves with the number of different measurements as more information can be gathered.

For example, said phase shift constitutes 0°, 90°, 180° and/or 270°. Four different measurements are used wherein each of the transmission signals transmitted during these measurements have the greatest possible phase difference with respect to each other, for instance 90°. Thus, a constant phase shift may be used ensuring that the transmitting signals are continuously transmitted with the dedicated phase shift.

According to another aspect, said measurements are triggered per pair depending on a defined phase value of a variable phase. Thus, the phase may be shifted variably wherein the measuring takes place when a defined or rather predetermined phase value is achieved. Such a phase shift may be achieved by an analog phase shifter which usually provides a continuously variable phase. The phase values can be set to 0°, 90°, 180° and/or 270° alternatively to the above mentioned aspect such that the measurements are triggered when these phase values are achieved.

Said channel matrix determined may be inverted such that an inverted channel matrix is obtained. Thus, the portion of a transmitted signal which is received by a certain receiving antenna can be determined when using the inverted channel matrix. For instance, the portion of a signal transmitted by a third transmission antenna can be determined which has been received by a third receiving antenna. Therefore, the inverted channel matrix and a vector corresponding to the signals transmitted by the transmission antennas can be multiplied with each other in order to determine the corresponding portions received by the receiving antennas of the device. Thus, information regarding each and every data channel can be obtained.

Moreover, said multiple-input and multiple-output device may be calibrated. The above mentioned steps can be repeated several times wherein the characteristics of the multiple-input and multiple-output device are adjusted subsequently.

The invention further provides a test system for testing a multiple-input and multiple-output device, said test system comprising at least two transmission antennas and a control unit, said control unit is configured to execute the method as mentioned above. This test system can be used to test and calibrate the multiple-input and multiple-output device in an efficient manner.

According to an aspect, said control unit has an analyzing function wherein said control unit is connected to said device. The control unit can be called control and analyzing unit as it controls the signals transmitted via the transmission antennas and it further analyzes the signals received by the receiving antennas. However, the whole device is connected with the control unit instead of the receiving antennas individually.

Further, at least one phase shifter may be provided which is connected to one of the at least two transmission antennas. As at least two transmission antennas are provided, only one phase shifter is necessary for setting a phase difference between the signals transmitted simultaneously. Thus, measurements are ensured wherein the signals transmitted are phase shifted with respect to each other. Nevertheless, two phase shifters may be used alternatively.

BRIEF DESCRIPTION OF DRAWINGS

The invention will now be described with reference to an exemplary embodiment which is shown in the enclosed drawing. In the drawing, FIG. 1 schematically shows a test system according to the invention.

DETAILED DESCRIPTION

In FIG. 1, a test system 10 is shown which is used for testing and calibrating a multiple-input and multiple-output device 12 which might be a transceiver, in particular a multiple-in and multiple-out (MIMO) wireless radio frequency (RF) transceiver.

The test system 10 comprises a chamber 14 which houses the device 12. Particularly, the chamber 14 is an anechoic chamber ensuring good measurement results as disturbing signals are excluded.

In the shown embodiment, the test system 10 further comprises an antenna array 16 having four transmission antennas 18, 20, 22, 24 wherein the antenna array 16 is allocated to the chamber 14 such that the signals transmitted via the antenna array 16 may be confined by the anechoic chamber 14.

Moreover, the test system 10 has a control and analyzing unit 26 having both a control function and an analyzing function. The control and analyzing unit 26 is connected to the transmission antennas 18-24 of the antenna array 16 such that the signals transmitted are controlled by the control and analyzing unit 26 as will be described later.

As shown in FIG. 1, the test system 10 comprises three phase shifters 28, 30, 32 which relate to the second to forth transmission antennas 20-24 such that the signals transmitted via these transmission antennas 20-24 can be phase shifted with respect to each other as well as the signals transmitted via the first transmission antenna 18. Therefore, the control and analyzing unit 26 is also connected to the phase shifters 28-32 for controlling purposes as will be described later. A further phase shifter relating to the first transmission antenna 18 can be provided additionally if desired.

In general, the phase shifters 28-32 may shift the phases discretely such that a constant phase shift is obtained. Alternatively, the phase shifters 28-32 may continuously vary the phase such that a variable phase shift is obtained.

In the shown embodiment, the multiple-input and multiple-output device 12 being tested by the test system 10 comprises four receiving antennas 34, 36, 38, 40. Accordingly, the multiple-input and multiple-output device 12 can be deemed as device under test (DUT).

The test system 10, in particular the control and analyzing unit 26, is configured to execute a method for testing the multiple-input and multiple-output device 12 wherein a channel matrix or rather channel information can be determined which is used to mathematically describe the relation of signals transmitted and the signals received.

In the shown embodiment, the signals transmitted can be described by a vector having four rows since four transmission antennas 18-24 are provided. The signals received can also be described by a vector having four rows since four receiving antennas 34-40 are provided. Thus, the channel matrix comprises four columns and four rows such that the channel matrix has 16 matrix elements in total.

The following measuring and analyzing steps are performed in order to determine the channel matrix.

A first test signal is transmitted via the first transmission antenna 18 wherein the first test signal is received by all receiving antennas 34-40 of the multiple-input and multiple-output device 12.

Then, a second test signal is transmitted via the second transmission antenna 20 wherein the second test signal is also received by all receiving antennas 34-40 of the multiple-input and multiple-output device 12.

A third test signal and a fourth test signal are transmitted via the third and fourth transmission antenna 22, 24 respectively wherein the third and fourth test signals are received by all receiving antennas 34-40 of the multiple-input and multiple-output device 12 accordingly.

Thus, each of the transmission antennas 18-24 transmits a corresponding test signal subsequently which signals are received by all receiving antennas 34-40.

As the receiving antennas 34-40 of the multiple-input and multiple-output device 12 receives the corresponding test signals, the phase difference of the receiving signals as well as their power are measured and analyzed by the control and analyzing unit 26.

During the transmission of the four test signals, the other transmission antennas 18-24 are shut off such that they do not send any disturbing signals which might impair the measuring results.

Afterwards, further transmitting signals are generated and transmitted via the transmission antennas 18-24 in pairs wherein the phase information is adjusted. This is done by the control and analyzing unit 26 which controls the phase shifters 28-32 accordingly.

For instance, the first and second transmission antennas 18, 20 form a first pair 42. Both transmission antennas 18, 20 transmit a first transmitting signal wherein a certain phase difference between the first transmitting signals transmitted simultaneously is set. This first transmitting signal is measured by all receiving antennas 34-40 of the multiple-input and multiple-output device 12.

Afterwards, second transmitting signals are transmitted simultaneously via the first pair 42 wherein the phase difference of these transmitting signals transmitted via the first pair 42 is adjusted such that a phase shift is set intentionally between the signal transmitted via the first transmission antenna 18 and the signal transmitted via the second transmission antenna 20.

The phase difference between these transmitting signals may be 180° wherein the phase shift of the first transmitting signals may be zero.

The second transmitting signals are also transmitted via the transmission antennas 18, 20 of the first pair 42 wherein the second transmitting signals have a different phase difference with respect to the phase difference of the first transmitting signals.

At least the power of both the first transmitting signals and the second transmitting signals are measured wherein the transmitting signals are received by all receiving antennas 34-40. Since the phases of the transmitting signals are set accordingly, it is not necessary to measure the corresponding phases. Nevertheless, this can be done for verification.

As four transmission antennas 18-24 are provided, further transmission pairs can be formed, for instance a second pair 44 consisting of the first transmission antenna 18 and the third transmission antenna 22 as well as a third pair 46 consisting of the first transmission antenna 18 and the fourth transmission antenna 24.

Accordingly, a fourth pair 48 and fifth pair 50 can be provided which consist of the second transmission antenna 20 and the third transmission antenna 22 or rather the third transmission antenna 22 and the fourth transmission antenna 24.

In addition, a sixth pair 52 can be formed which consists of the third transmission antenna 22 and the fourth transmission antenna 24.

Thus, four transmission antennas 18-24 can establish six different pairs 42-52. In general, n transmission antennas result $$m = \frac{n*(n-1)}{2}$$

different pairs.

The same measurements regarding the amendments of the phase information are performed with regard to all these different pairs 42-52 subsequently.

Moreover, three or more different measurements can be performed for each pair 42-52 wherein the phase information is always different with respect to the other measurements of the corresponding pair 42-52.

Generally, the phases are shifted such that each of the transmission signals during the measurements have the greatest possible phase difference with respect to each other. For instance, four measurements per pair 42-52 can be performed wherein the phase differences are 0°, 90°, 180° and 270°.

The phase difference between the two transmitting signals per pair 42-52 during a certain measurement is adjusted via the corresponding phase shifter 28-32 which are controlled by the control and analyzing unit 26 accordingly.

All these information gathered during these measurements may be used for determining the channel matrix.

The intended phase shift during the measurements ensures that information can be gathered regarding the complex portions of each matrix element of the channel matrix referring to a certain data channel.

Accordingly, the channel matrix can be calculated directly by using the obtained measuring results. In turn, the calculation of the channel matrix allows inverting the channel matrix in order to obtain an inverted channel matrix.

The inverted channel matrix can be used to determine the portion of a transmitted signal which is received by a certain receiving antenna. For instance, it is possible to determine the portion of a signal transmitted by the third transmission antenna 22 which is received by the third receiving antenna 38 without the need of a cable connection between the test system 10 and the multiple-in and multiple-out device 12. Thus, each data channel can be calculated directly.

As described above, the control and analysis unit 26 is used to control the phase shifters 28-32 appropriately in order to shift the phases of the transmitting signals for the transmitting signals such that a phase difference is set for the several measurements.

In addition, the received signals are measured and analyzed by the control and analysis unit 26. However, the control and analysis unit 26 has not to be connected to each of the receiving antennas 34-40 individually for determining the exact portions received by the receiving antennas 34-40. This is done mathematically by calculating the inverted channel matrix.

If the phase shifters 28-32 vary the phase continuously such that a variable phase shift is obtained, the measurements can be triggered such that a measurement is initiated when a certain, in particular predetermined, shift value is achieved. The triggering on the predetermined shift value ensures that a certain phase shift is set which is necessary for the measurements as it is done when using phase shifters which shift the phases such that a constant phase shift is obtained.

As no cable connection is required, the control and analyzing unit 26 can be split in different units formed separately. A separately formed control unit only controls the phase shifters 28-32 as well as the transmission antennas 18-24 such that they are shut off accordingly. In addition, a separately formed analyzing unit measures and analyzes the received signals by the multiple-input and multiple-output device 12, in particular its receiving antennas 34-40.

Thus, it is possible to test and calibrate the multiple-input and multiple-output device 12 without any cable connection between corresponding transmission antennas 18-24 and receiving antennas 34-40 respectively.

The invention claimed is:

1. A method of using a test system to test a multiple-input and multiple-output device, said device comprising at least two receiving antennas, comprising the following steps:
   a) directing the test system to transmit a first test signal via a first transmission antenna of said test system,
   b) measuring, with the test system, the first test signal via each receiving antenna of said device,
   c) directing the test system to transmit at least a second test signal via a second transmission antenna of said test system,
   d) measuring, with the test system, the second test signal via each receiving antenna of said device,
   e) directing the test system to transmit further transmitting signals via the transmission antennas in pairs wherein a phase difference is set between the phases of said transmitting signals transmitted via the pair of transmission antennas,
   f) measuring, with the test system, said further transmitting signals via each receiving antenna of said device, and
   g) determining, with the test system, a channel matrix based on the further transmitting signals measured via each receiving antenna of said device.

2. The method according to claim 1, wherein at least one other transmission antenna is switched off during at least one of step a) and step c).

3. The method according to claim 1, wherein a phase difference is determined during at least one of step b), step d), and step f).

4. The method according to claim 1, wherein said further transmitting signals are transmitted via all the possible pairings of transmission antennas of the test system successively.

5. The method according to claim 1, wherein at least two different measurements are performed for each pair wherein said transmitting signals of the transmission antennas forming an appropriate pair are phase shifted with respect to each other for each measurement such that different phase differences are obtained.

6. The method according to claim 1, wherein at least three different measurements are performed for each pair with the test system wherein the transmitting signals of the two transmission antennas forming an appropriate pair are phase shifted with respect to each other for each measurement such that different phase differences are obtained.

7. The method according to claim 1, wherein said phase shift constitutes at least one of 0°, 90°, 180°, and 270°.

8. The method according to claim 1, wherein said measurement is triggered per pair depending on a defined phase value of a variable phase.

9. The method according to claim 1, wherein said channel matrix determined is inverted such that an inverted channel matrix is obtained.

10. The method according to claim 1, wherein said multiple-input and multiple-output device is calibrated.

11. A test system for testing a multiple-input and multiple-output device, said test system comprising at least two transmission antennas and a control unit, said control unit is configured to execute the method according to claim 1.

12. The test system according to claim 11, wherein said control unit has an analyzing function and wherein said control unit is connected to said device.

13. The test system according to claim 11, wherein at least one phase shifter is provided which is connected to one of the at least two transmission antennas.

14. The method according to claim 1, wherein said test system comprises at least three transmission antennas, said at least third transmission antenna is switched off during step e).

15. The method according to claim 1, wherein a power is determined during at least one of step b), step d), and step f).

* * * * *